Figure 1:
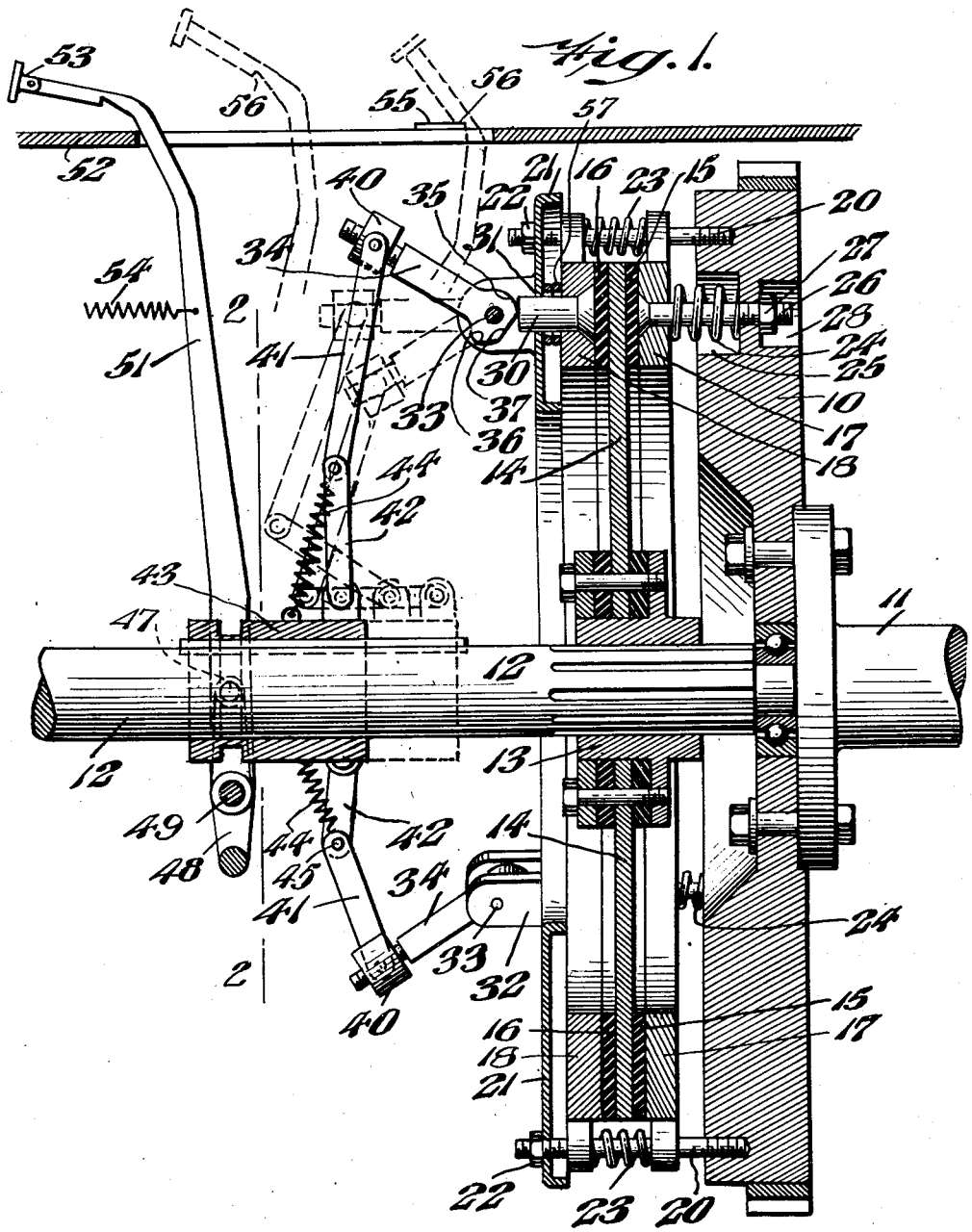

June 4, 1935.  H. H. VAIL  2,003,323
AUTOMATIC CLUTCH
Filed Dec. 28, 1923  4 Sheets-Sheet 2

INVENTOR.
HENRY H. VAIL.
BY Robert M. Barr
ATTORNEY.

June 4, 1935.  H. H. VAIL  2,003,323
AUTOMATIC CLUTCH
Filed Dec. 23, 1923   4 Sheets-Sheet 4

INVENTOR.
HENRY H. VAIL,
BY Robert M. Barr.
ATTORNEY

Patented June 4, 1935

2,003,323

UNITED STATES PATENT OFFICE 2,003,323

AUTOMATIC CLUTCH

Henry H. Vail, Camden, N. J., assignor to Automatic Drive and Transmission Company, Gloucester City, N. J., a corporation of New Jersey Application December 28, 1928, Serial No. 329,007

23 Claims. (Cl. 192—105)

The present invention relates to power transmitting mechanisms and more particularly to an automatically operated clutch for automobiles and other motor vehicles.

In the operation of automobile clutches by the use of centrifugal devices for bringing one clutch plate into frictional contact with another clutch plate, or bringing a set of clutch plates into frictional contact with another set of clutch plates, adjustment of the parts must be such that at idling speed of the engine the driving clutch plate (or plates) is out of contact with the driven plate (or plates). In other words, there should be a neutral position of the clutch plates wherein no movement is transmitted as otherwise the vehicle could not be brought to a standstill with the transmission in gear. The fact that a neutral position is necessary introduces, however, practical difficulties, for example, if the automobile stops while on a hill the centrifugal control automatically declutches the clutch and hence there can be no braking effect through the engine when the transmission is shifted into low gear and the manually operated brakes alone must hold the automobile. Further should the engine stall while the automobile is upon a railroad track, or anywhere else for that matter, and refuse to start, the automobile could not be driven off by using the starter as motive power because the latter could not produce sufficient engine speed to cause the centrifugal means to operate to hold the clutch in engagement for the purpose.

Some of the objects of the present invention are to provide an improved automatic clutch mechanism for automobiles and other motor vehicles; to provide a clutch mechanism wherein the movable parts thereof are independently controllable by automatic and manual means; to provide a centrifugally operated clutch mechanism wherein provision is made for holding a clutch in clutching position independently of the centrifugal control means; to provide a mechanism wherein a centrifugally controlled clutch can be retained in clutching engagement when the engine which operates the centrifugal mechanism is at rest; to provide means whereby an automobile can be driven by the starting motor in case a centrifugal clutch control is rendered ineffective by the stalling of the engine which operates such control; to provide a mechanism wherein braking can take place against the compression of an engine which operates a centrifugal control for a clutch; and to provide other improvements as will hereinafter appear.

Figure 2:
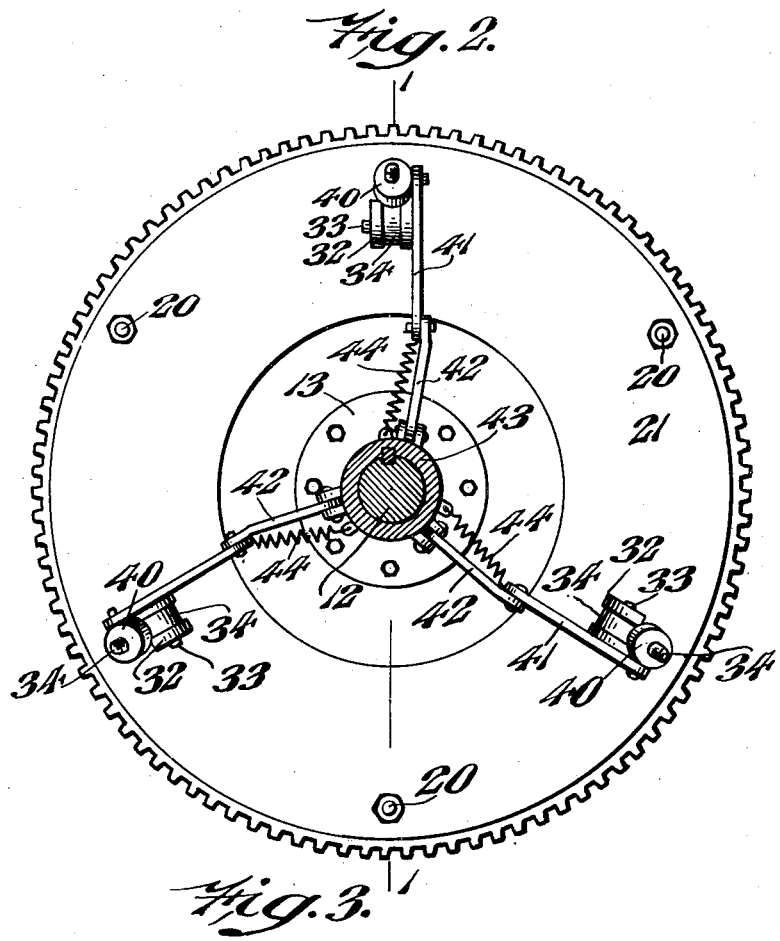
Figure 3:
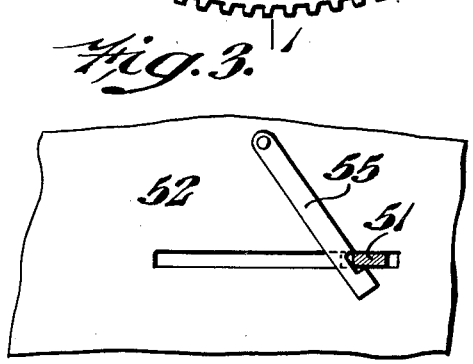
Figure 4:
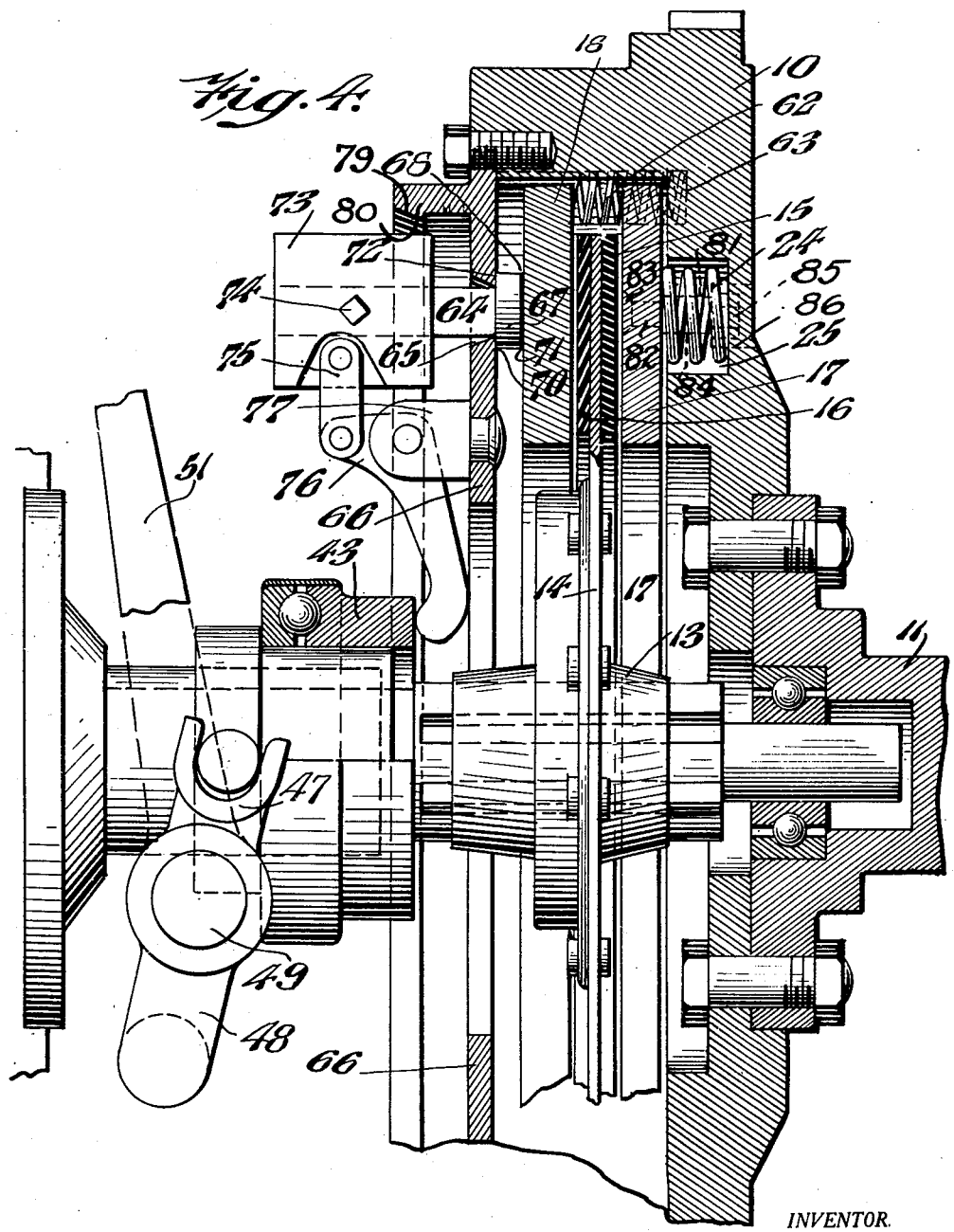
Figure 5:
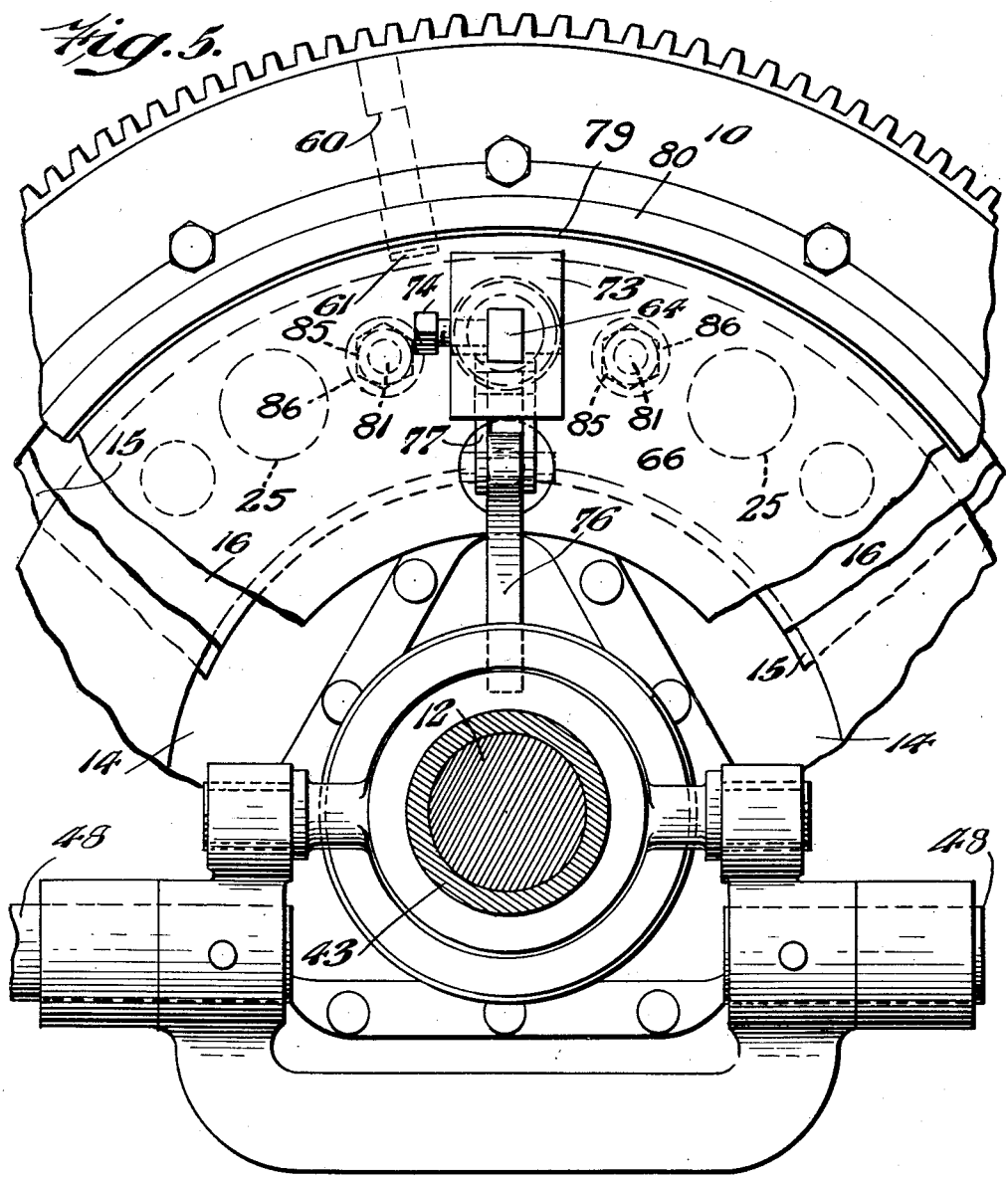
Figure 6:
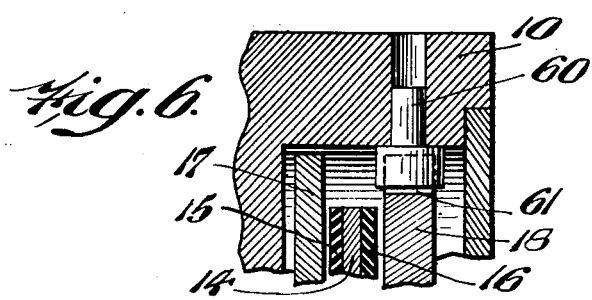

In the accompanying drawings, Fig. 1 represents a section on line 1—1 of Fig. 2 of a clutch embodying one form of the present invention; Fig. 2 represents a section on line 2—2 of Fig. 1 and also showing an elevation of one form of automatic and manual control; Fig. 3 represents a detail of the manual control lever; Fig. 4 represents a sectional elevation of the major portion of an automatic clutch mechanism embodying a modified form of the invention; Fig. 5 represents a face view of the same; and Fig. 6 represents a sectional detail of the flywheel driving pin construction.

Referring to the drawings, one form of the present invention is shown attached to a flywheel 10 mounted upon the driving or engine shaft 11 and arranged to transmit motion to a driven shaft 12 through the mechanism of the present invention. As here shown, the driven shaft 12 has a splined end for mounting a hub 13 of a clutch plate 14 which has its outer circumferential edge portion located between annular plate rings 15 and 16 of wear resisting friction material. The ring 15 is interposed between the clutch plate 14 and a backing plate 17 while the ring 16 is interposed between the clutch plate 14 and a movable clutch ring plate 18, which may be termed an automatic plate as it is automatically actuated in a manner to be hereinafter described.

In order to maintain the plates 17 and 18 normally declutched, that is without any pressure upon the rings 15 and 16, and also to hold the said plates in proper juxtaposed position, a number of stud bolts 20 are threaded into the inner face of the flywheel 10 and pass through apertures in the plates 17 and 18 to finally project through a ring member 21 to receive fastening nuts 22. Ring or plate member 21 takes the reaction of the centrifugal mechanism and will therefore be hereinafter referred to as a reaction plate. That portion of each bolt 20 which lies between the plate 17 and 18 is encircled by a coil spring 23 under tension to exert a spreading action upon the plates and normally hold them out of contact.

For holding the backing plate 17 in position to receive the thrust applied by the clutch ring plate 18, a plurality of coil springs 24 are seated in sockets 25 bored in the face of the flywheel 10 and held under compression by the backing plate 17. This compression is held by bolts 26 secured to the plate 17 and passing axially of the respective springs 24 and through the flywheel to receive nuts 27 which are preferably received in recesses 28. These recesses 28 are accessible through the usual openings in a clutch housing for the purpose of adjusting the bolts 26 to compensate for wear on the face of the plate 17.

In order to move the clutch plate 18 to produce frictional clamping engagement upon the driven plate 14, the plate 18 has a plurality of outwardly extending lugs 30 which are rigidly secured thereto in any desired manner and pass respectively through slots 31 formed in the ring member 21 for free sliding movement. In close proximity to each of the slots 31, the ring 21 is provided with ears 32 which serve to support a pin 33. These pins 33 act respectively as pivots for cam levers 34 each consisting of a short arm having two opposite cam faces 35 and 36 connected by a plane surface 37; the latter in neutral or declutched position of the plates 17 and 18, seat against the respective ends of the lugs 30. The design of the cam levers 34 is such that, when moved outwardly, each cam face 35 will engage its lug 30 and move the latter continuously and uniformly, while if the levers 34 are swung inwardly each cam face 36 will engage its lug 30 and move the latter quickly to full clutched position. The levers 34 in accordance with the present invention can be operated by an automatic control and by a manual control, the one independent of the other so that at any time the manual control can take the place of the automatic control.

In the preferred form of the invention each lever 34 has its long arm terminating in a screw thread which receives a centrifugal weight 40 so that the latter can be adjusted for a predetermined throw and then fixed in such adjusted position. The outward throw of each weight 40 is limited by two links 41 and 42 pivoted together, the free end of each of the links 41 being pivoted to its weight 40 and the free end of each of the links 42 being pivoted to a collar 43 keyed to and slidable lengthwise of the driven shaft 12. The arrangement is such that the weights 40 are free to swing outwardly sufficiently far to produce the maximum clutching effort required and their function is to automatically control the clutching and declutching of the clutch plates. A spring 44 is stretched between the pivot 45 of each of the links and the collar 43 to give a quick breaking of the toggle-like connection.

For operating the collar 43 manually it is provided with a circumferential slot in which rides the bifurcated end 47 of a rock arm 48 which is fast to a rock shaft 49 journalled in the housing and projecting at one end to receive a pedal lever 51. This lever 51 has its upper end projecting through the floor 52 to terminate in a pedal 53, while a spring 54 is stretched between it and a fixed point and serves to return the lever to the inoperative position where the clutch plates are disengaged. Where it is desired to hold the clutch engaged through the manual control, the pedal lever 51 can be locked in clutching position by shifting a latch 55 into the path of a shoulder 56 provided on the pedal lever 51. Preferably the latch 55 is pivoted to the floor 52 where it can be kicked into locking position after the foot pedal has been brought to the position where the clutch plates are engaged to transmit motion from the driving shaft to the driven shaft. At this time the cam levers 34 are all down so that the quick acting cams are holding the lugs 30 pressing the clutch plates together and maintaining connection between the engine and the driven parts.

From the foregoing it will be evident that the levers 34 can assume three control positions; one substantially horizontal to hold the clutch in neutral positions; one with the free ends of the levers 34 on the outer side of the lever fulcrum to automatically hold the clutch in clutching position; and one with the free ends of the levers 34 on the inner side of the lever fulcrum to also hold the clutch in clutching position. In two of the three positions of the levers 34, control is had by the centrifugal weights, and in another combination of two of the three positions of the levers 34 control is had by the manual lever 51. Thus the automatic control holds the levers 34 in neutral position at idling speeds, and shifts them to clutching position at running speeds, while the manual lever 51 can return the levers to neutral position against the pull of the centrifugal force at any time, and can also shift them from neutral position to the other clutching position. These last two actions take place by depressing the foot pedal lever 51 part way to throw the clutch into neutral position, and then by depressing it all the way the clutch can be thrown in and held by locking the lever 51 down.

Attention is directed to the assembly of the springs 27 in that a simple and effective construction has been devised for maintaining the backing plate 17 always in operative position opposite to the thrust of the plate 18 regardless of face wear. Thus should there be face wear of the plate 17 such as would cause slipping of the plates, it can be readily corrected by backing off the nuts 27 to lengthen that portion of the bolt shanks lying between the flywheel 10 and the plate 17 so that the friction face of the latter is restored to its proper operating position. This construction ensures a long life to the plate 17 without any loss of efficiency due to wear.

In order to prevent rattling and improper relative movement between the ring member 21 and the plate 18, it is preferable to employ relatively light coil springs 57 between them. The springs 57 are held under compression and respectively encircle the lugs 30 to prevent displacement when the plate 18 is moved to clutching position.

The form of the invention shown in Figs. 4 and 5 embodies a modified automatic clutch operating mechanism while for practical purposes the parts are shown as built in and enclosed by the flywheel 10. For convenience and brevity of description those parts which are the same as shown and described in connection with Fig. 1 are identified by like reference numerals. In this instance the clutch plate 18 is driven by means of driving pins 60 projecting radially internally of the flywheel 10 and respectively seating in notches 61 cut in the circumference of the plate 18. Also the plate 18 is normally held and returned out of clutching relation by hold back springs 62 positioned in pockets 63 of the flywheel 10 and compressed between the plate 18 and the flywheel to maintain the desired spring pressure. The plate 17 is provided with a plurality of driving studs 81 which are reduced at 82 where they pass through the plate and are riveted over at 83, to hold them securely in position. The studs fit rather snugly and slidably in apertures 84 formed in the flywheel web, and are provided at the ends thereof with heads 85 to limit movement of the plate to the left as shown in Figure 4. The heads of the studs are received by counter bores 86, shown in dotted lines in this figure. It will, therefore, be seen that plate 17 is capable of movement in a direction parallel to the axis of the fly-wheel, and at the same time is caused to rotate therewith, due to the driving engagement of the studs 81 in the apertures 84.

Disposed between each pair of studs is a recess 25 provided with compression springs 24 for urging the plate 17 away from the fly-wheel web. These springs, cooperating with the plate 17, give the clutch smooth operatitve characteristics. It is obvious that the initial movement of plate 18 will cause the clutch members 15 and 16 to be lightly gripped, and the spring 24 to be slightly compressed, and as the movement continues, the spring 24 will undergo greater compression, the plates will take hold with increased force, thus imparting to the driven member a smooth starting effort.

In this form of the invention motion is transmitted to the plate 18 by lever arms 64 projecting respectively through tapered holes 65 in a flanged cover 66 fastened to the open face of the flywheel 10. Cover 66 likewise takes the reaction of the centrifugal weight and is therefore a reaction plate or member. Each of the lever arms 64 terminates in a flat head 67 normally held between the plate 18 and the inner face of the cover or reaction plate 66 under the influence of springs 62 and the arrangement is such that when the head 67 is in the position shown in Fig. 4 the plates 17 and 18 are in neutral or declutched position but if the arm 64 is moved either radially outward or inward the head 67 fulcrums and acts as a lever to force the plate 18 away from the cover 66 to cause the desired clutching action for driving purposes. If the arm 64 moves radially outward the edge 68 of the head 67 acts against the plate 18 and the edge 70 becomes the fulcrum bearing against the fixed cover 66. If the arm 64 moves radially inward the edge 71 of the head 67 acts against the plate 18 and the edge 72 becomes the fulcrum bearing against the fixed cover 66. Therefore each edge, 68 and 71, of the head 67 may be considered as a cam face when cooperating with the plate 18.

For automatically shifting the arms 64, the projecting end of each carries a weight 73 arranged for adjustment lengthwise of the arm 64 and held fixed in adjusted position by a set stud 74. At a predetermined low speed of flywheel rotation the centrifugal force developed by the weights 73 causes the plate 18 to move against the relatively light pressure of the hold back springs 62 and thus brings the plates to clutching position.

For manually shifting the arms 64, each of the weights 73 is connected through a link 75 and a bell crank 76 for operation by the movable sleeve 43. Each bell crank 76 is pivoted in ears 77 fixed to the cover 66 and the free end of the bell crank terminates in the path of movement of the sleeve 43 so that when the pedal lever 51 is pressed down the sleeve 43 will move to transmit motion to the bell cranks 76. This movement acts first to pull the weights 73 into neutral position and then continued movement in the same direction acts to shift the plate 18 into clutching relation.

The parts as illustrated in Figure 4 are disposed in the positions they assume when the lever 51 is held in its intermediate position. Under these conditions acceleration of shaft 11 is ineffective to produce clutch engagement because levers 64 are restrained from fulcruming in response to the centrifugal force developed by weights 73, through link 75, bell crank 76, and sleeve 43. If it is desired to restore the mechanism for automatic operation, lever 51 is shifted rearwardly to withdraw sleeve 43 out of the range of movement of bell cranks 76, so that the inner ends of the latter may move to the left in response to outward movement of weights 73.

In this form of the invention the centrifugal mechanism is limited in its outward swinging movements by means of the bevel face 79 provided on the flange 80 of cover 66. The weights 73, in responding to the centrifugal force produced by rotation of the fly-wheel, move outwardly and rest against the bevel face 79. This prevents the clutch material from excessive compression at high engine speeds. It will be understood, however, that this particular form of limiting means is not essential to the proper operation of this device, since it may be dispensed with and the collar 43 adjusted in connection with the lever 51, so that, when the lever 51 is in its retracted position, the weight 73, upon swinging outwardly, will be limited by engagement of the bell crank lever 66, contacting with the collar 43. The desirability of providing a stop means for the centrifugal weight in a device of this character will become apparent when it is remembered that the force exerted by the weights varies as the speed of rotation of the fly-wheel. Hence, if no stop means were provided, the clutch plates, at high engine speed, would be brought together with excessive force.

Having thus described my invention, I claim:

1. In a clutch mechanism, the combination of a driving shaft, a driven shaft, a clutch including friction plates interposed between said shafts, a support, a plurality of levers pivoted to said support, each of said levers terminating at one end in two spaced cams, a centrifugal weight on each lever arranged to cause one of said cams to abut a part of one of said clutch plates for clutching, and means including a manually operable lever for moving said levers to cause the other of said cams to abut a part of said clutch plate to cause clutching.

2. In a clutch mechanism, the combination of a driving shaft, a driven shaft, a clutch including friction plates interposed between said shafts, a support, a plurality of levers pivoted to said support, each of said levers terminating at one end in two spaced cams, one of said cams shaped to give uniform lineal movement and the other of said cams shaped to give accelerated lineal movement, a centrifugal weight on each lever arranged to cause said uniform cam to abut a part of one of said clutch plates for clutching, and means including a manually operable lever for causing the other of said cams to abut a part of said clutch plate to cause quick clutching.

3. In a clutch mechanism, the combination of a driving shaft, a driven shaft, a clutch including friction plates interposed between said shafts, a support, a plurality of levers pivoted to said support, each of said levers terminating at one end in two spaced cams, one of said cams shaped to give uniform lineal movement and the other of said cams shaped to give accelerated lineal movement, a centrifugal weight on each lever arranged to cause said uniform cam to abut a part of one of said clutch plates for clutching, means including a manually operable lever for causing the other of said cams to abut a part of said clutch plate to cause quick clutching, and means to lock said manually operable lever in position to maintain said plates in clutched relation.

4. In a clutch mechanism, the combination of a driving shaft, a driven shaft, a clutch including friction plates interposed between said shafts, a mechanism for shifting said clutch plates, a support, a plurality of levers pivoted to said support, each lever having a face at one end to allow said mechanism to be disposed in neutral position and having two cam faces at opposite ends of said neutral face for moving said mechanism to clutching position, and automatic and manual means for separately actuating said levers.

5. In a clutch mechanism, the combination of a driving shaft, a driven shaft, a clutch including friction plates interposed between said shafts, a mechanism for shifting said clutch plates, a support, a plurality of levers pivoted to said support, each lever having a face at one end to allow said mechanism to be disposed in neutral position and having two cam faces at opposite ends of said neutral face for moving said mechanism to clutching position, centrifugal and manual means for separately actuating said levers, said manual means also acting to limit the throw of said centrifugal means.

6. In a clutch mechanism, a friction clutch, means including a plurality of levers for causing said clutch to engage and disengage, each of said levers being arranged to take one position wherein said clutch is disengaged and positions at opposite sides of said disengaged position to cause clutch engagement, centrifugal means for moving said levers in one direction from disengaged position to engaged position, and manual means for moving said levers in the opposite direction to disengaged position or to engaged position.

7. In a clutch mechanism, a driving shaft; a driven shaft, clutch plates operatively associated with said shafts and mounted for movement longitudinally thereof; centrifugal means for wedging said plates together in frictional engagement in response to rotation of said driving shaft; and manually operable means movable in one direction to disengage the clutch, and also operable when moved in said one direction to force the plates together independently of centrifugal action.

8. In a clutch mechanism, the combination of driving and driven shafts; friction plates operably interposed between said shafts and adapted to be engaged and disengaged; means, having two clutching positions and a neutral position therebetween, said means being automatically operable to one of said clutching positions to cause clutching engagement of said plates in response to attainment of a predetermined speed of said driving shaft; and means for shifting said first named means to its other clutching position and causing clutch engagement.

9. In a clutch mechanism, the combination of driving and driven shafts; friction plates operably interposed between said shafts and designed to be engaged and disengaged; means, having two clutching positions and a neutral position therebetween, said means being automatically operable toward one of said clutching positions to cause clutching engagement of said plates in response to attainment of a predetermined speed of said driving shaft, and manually controlled means for causing clutching engagement of said plates while shifting said means to its other clutching position.

10. A power transmitting mechanism comprising a driving member; a driven member; a plurality of movable elements designed to cause engagement of said driving and driven members when said elements are disposed either side of a neutral position; means for automatically moving said elements to one side of said neutral position when said driving member is rotated above a predetermined speed, and means for causing said elements to move to the other side of said neutral position.

11. The power transmitting mechanism set forth in claim 10 wherein said first named means comprises speed-responsive means associated with said elements.

12. The power transmitting mechanism set forth in claim 10 wherein said first named means comprises centrifugal weights operably connected to said elements.

13. The power transmitting mechanism set forth in claim 10 wherein said last named means is manually operable.

14. An automatic power transmitting mechanism comprising a flywheel; a driven shaft; an automatic plate mounted for movement axially of said shaft and driven by said flywheel; a driven member carried by said driven shaft and disposed between said flywheel and said automatic plate; a reaction plate disposed parallel to said automatic plate and also driven by said flywheel, said automatic plate being disposed between said reaction plate and said flywheel; and means for automatically moving said automatic plate axially toward said flywheel and into frictional driving engagement with said driven member when said flywheel attains a predetermined speed, said automatic means comprising a plurality of elements fulcruming against flat surface portions of said automatic plate and reacting against flat surface portions of said reaction plate, said elements fulcruming against said automatic plate and reacting against said reaction plate within the outer periphery of said automatic plate.

15. In a clutch mechanism, driving and driven members providing radial frictional surfaces cooperating with each other for engagement and disengagement; a reaction member mounted for synchronous rotation with said driving member; means for causing separation of said driving and reaction members and engagement of said driving and driven members when said driving member attains a predetermined speed, said means comprising a plurality of levers carried by said reaction member and having portions acting upon said driving member and reacting against surface portions of said reaction member, said levers projecting away from, and being wholly disposed to that side of said driving member against which they act, and having centrifugally operable weights carried thereby, and means for establishing a yielding contact pressure between said driving and driven members when the latter are engaged under the influence of said levers.

16. In a clutch mechanism, a driving member and a reaction member mounted for synchronous rotation and for relative axial movement; resilient means normally urging said members toward each other; means for causing said members to separate against the action of said resilient means when said members attain a predetermined speed, said separating means comprising a plurality of levers having portions fulcruming and reacting against surface portions of said members, said levers extending loosely through apertures in said reaction member, whereby fulcruming of said levers is insured and bodily displacement of the latter in response to centrifugal force is precluded.

17. In a clutch mechanism, a driving member and a reaction member mounted for synchronous rotation and for relative axial movement; means for causing said members to separate when said members attain a predetermined speed; said separating means comprising a plurality of levers having fulcrum portions acting against one of said members and reacting against the other of said members, said reaction member being provided with a plurality of apertures through which said levers extend, said fulcrum portions always contacting the surface of said last mentioned member adjacent said apertures.

18. In a clutch mechanism, a driving member and a reaction member mounted for synchronous rotation and for relative axial movement, said members having facing parallel surfaces provided thereon; lever members disposed wholly to one side of said driving member and having portions providing substantially parallel surfaces that normally lie in face contact with the parallel surfaces of said members, fulcrums formed on said lever portions, means for causing said levers to fulcrum and separate said members when the latter attain a predetermined speed, comprising means carried by said reaction member for preventing said levers from being circularly displaced with respect to said members, and means, supported by said reaction member and providing stop faces, adapted to be engaged by said lever members for limiting their range of movement in response to variations in the speed of said members.

19. A power transmitting mechanism comprising a driving member and a driven member mounted for engagement and disengagement; a plurality of rockable lever elements having portions disposed between said members and adapted to cause engagement of said members when they are rocked either side of a neutral position; means for causing said elements to rock to one side of said neutral position when said driving member is rotated above a predetermined speed; and mechanism for moving said elements to the other side of said neutral position.

20. The mechanism described in claim 19, wherein said lever elements are disposed wholly to one side of said driving member, and lie within the outer periphery of the engaging areas of said driving and driven members.

21. In a clutch mechanism, a driving shaft; a driven shaft, clutch plates operatively associated with said shafts and mounted for movement longitudinally thereof; centrifugal means for wedging said plates together in frictional engagement in response to rotation of said driving shaft; and manually operable means operably connected to said centrifugal means for wedging said plates together in frictional engagement at the will of the operator both while said driving shaft is rotating or is stationary, said manually operable means being provided with locking means for holding said clutch plates in frictionally wedged engagement.

22. The clutch mechanism described in claim 17 wherein the fulcrum portions of said levers extend toward the axis of the mechanism inwardly of said apertures and are operable to separate said driving and reaction members when said levers are rocked away from the axis of the mechanism.

23. The clutch mechanism described in claim 17, wherein said fulcrum portions of said levers also extend away from the axis of the mechanism outwardly of said apertures, and said levers are also operable to rock toward the axis of the mechanism and separate said driving and reaction members.

HENRY H. VAIL.